June 1, 1926.
A. L. HUMPHREY
TRAILER ATTACHMENT
Filed April 10, 1925
1,587,074
2 Sheets-Sheet 1
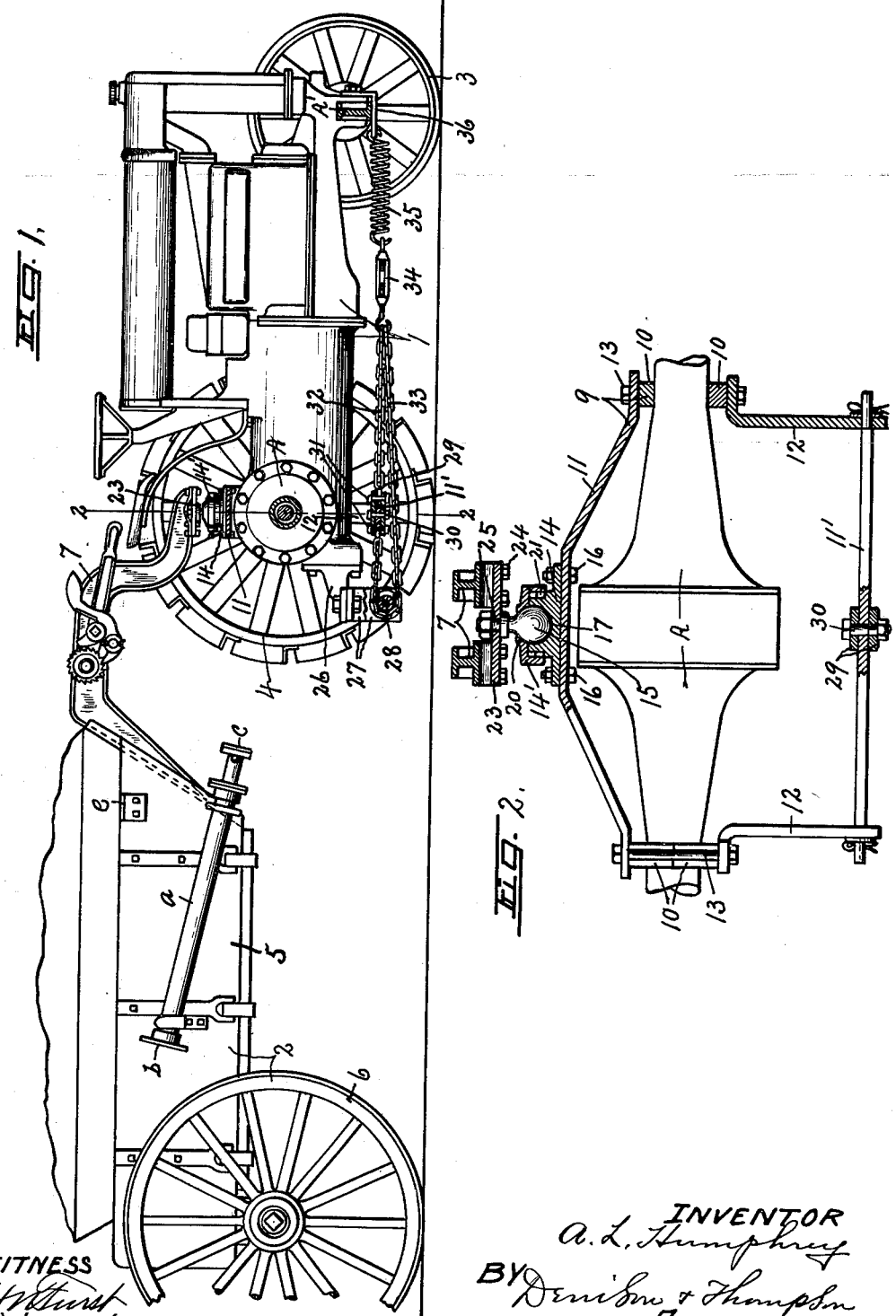

June 1, 1926.
A. L. HUMPHREY
1,587,074
TRAILER ATTACHMENT
Filed April 10, 1925
2 Sheets-Sheet 2
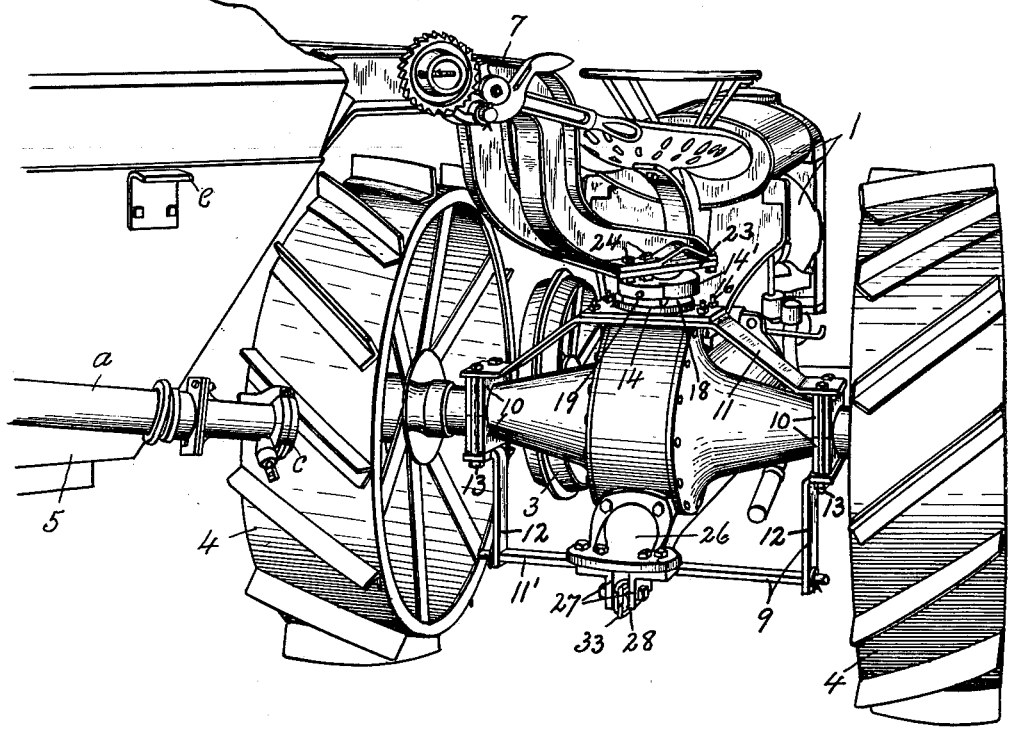
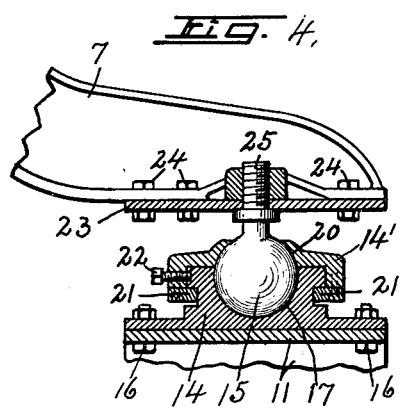
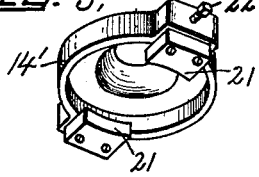
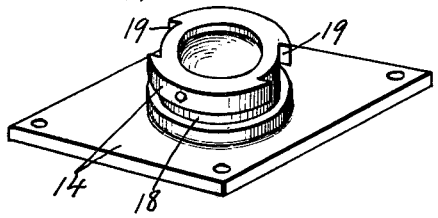

Patented June 1, 1926.

1,587,074

UNITED STATES PATENT OFFICE.

ALONZO L. HUMPHREY, OF AUBURN, NEW YORK, ASSIGNOR TO EAGLE WAGON WORKS, OF AUBURN, NEW YORK, A CORPORATION OF NEW YORK.

TRAILER ATTACHMENT.

Application filed April 10, 1925. Serial No. 22,234.

This invention relates to semi-trailer attachments for Fordson and other tractors in which the front end of the trailer carrying the load is mounted upon a supplemental frame carried by the rear end of the tractor frame in such manner as to permit the traction wheels of the tractor to turn under the front end of the trailer frame for steering purposes.

In apparatus of this character the front end of the trailer is usually attached to the tractor housing some distance above or below the axis of the traction wheels and when the point of connection is above said axis and the trailer is drawn forwardly by the tractor the tendency is to tilt the front end of the tractor upwardly while on the other hand if the connection is below said axis it necessitates the construction of a special neck of excessive length and height on the front end of the trailer to permit the relative turning of the traction wheels thereunder.

These, of course, are objectionable features in apparatus of this character in that they either reduce the efficiency of operation or render the apparatus excessively cumbersome and costly in manufacture and the main object of the present invention is to overcome these objections and at the same time to permit the use of trailers having necks of ordinary length and height such as are commonly employed on dump wagons which, by employing the improved attachment, may be used as a trailer for tractors by simply removing the front axle and wheels and mounting the front end of the neck upon a supplemental frame on the rear end of said tractor.

Another object is to provide the attachment with an universal joint which permits the tractor and trailer to automatically adjust themselves to varying levels, particularly in passing over obstructions and at any steering angle.

Other objects and uses relating to specific parts of the device will be brought out in the following description.

In the drawings:

Figure 1 is a side elevation, partly in section, of a semi-trailer showing my improved attachment or connection between the trailer and tractor.

Figure 2 is an enlarged transverse vertical sectional view taken in the plane of line 2—2, Figure 1, except that the central portion of the axle housing is shown in elevation and the ends thereof broken away.

Figure 3 is an enlarged perspective view of the tractor and adjacent portion of the trailer together with the connections between the trailer and rear end of the tractor which is shown as turned at an angle to the trailer to indicate the position of one of the wheels when turning under the neck of the trailer.

Figure 4 is an enlarged detail sectional view of the ball and socket connection between the front end of the neck of the trailer and supplemental frame on the tractor.

Figures 5 and 6 are perspective views respectively of the upper and lower socket sections shown in Figure 4.

The device forming the subject matter of this invention is adapted to be used in connection with a Fordson tractor, or other tractor —1— and a semi-trailer —2—, the tractor —1— being provided with the usual front steering wheels —3— and rear traction wheels —4— while the trailer —2— comprises a dump box —5— having its rear end supported by suitable wheels —6— and its front end provided with an upwardly arched neck —7— having its front end operatively connected to a supplemental frame —9— in a manner presently described.

This supplemental frame —9— is mounted on the rear axle housing —A— and comprises opposite pairs of clamping members —10—, an upper cross bar —11— and opposite hangers —12— which are connected at their lower ends by a lower cross bar —11'—.

The outer ends of the upper and lower cross bars —11— and —11'— are engaged respectively with the upper and lower faces of the clamping members —10— and are clamped against said faces by bolts —13— which also serve to hold the members —10— on to the axle housing —A— as shown more clearly in Figure 2.

The front end of the trailer neck —7— is connected to the upper cross bar —11— of the supplemental frame —9— by a universal joint consisting in this instance of socket sections —14— and —14'— and a ball section —15—, the socket section —14— being secured by bolts —16— or equivalent fastening means to the central portion of the bar —11— and provided with a substantially semi-spherical concave seat —17— in its upper side for receiving the ball —15—.

The portion of the socket section —14— in which the concave seat —17— is formed preferably consists of a cylindrical boss having an annular groove —18— and diametrically opposite recesses —19— extending upwardly from the groove and preferably in the front and rear sides thereof for a purpose presently described.

The socket section —14'— is telescopically mounted upon the section —14— and is provided with a central vertical opening therethrough forming a concave seat —20— for the upper portion of the ball —15—, said section —14'— being provided with diametrically opposite lugs or flanges —21— of slightly less circumferential length than the recesses —19— to permit them to readily enter the recesses when the socket sections are assembled one upon the other, said lugs or flanges being arranged to register with the annular groove —18— so that when the parts are assembled the section —14'— may be turned about the axis of the section —14— to bring the flanges —21— out of registration with the recesses —19— and into registration with the underside of the upper walls of the groove —18— at opposite sides of the boss on the section —14— thereby locking the two socket sections together against vertical displacement.

The section —14'— is provided in one side with a threaded aperture for receiving a set screw —22— by which the two socket sections may be locked together against relative turning movement when the ball —15— is seated therein ready for use.

The neck —7— of the trailer preferably comprises a pair of frame bars which converge forwardly but are spaced some distance apart at their forward ends and held in fixed relation by a clamping plate —23— secured to the undersides thereof by bolts —24— or equivalent fastening means.

The ball —15— of the universal joint is provided with a threaded shank —25— extending upwardly through an aperture in the central portions of the plate —23— and firmly clamped thereto.

It will be observed from the foregoing description that in order to detach the trailer from the tractor it is simply necessary to loosen the set screw —22— and then to turn the section —14'— about its axis sufficiently to register the flanges —21— with the recesses —19— whereupon the front end of the trailer with the ball —15— and section —14'— thereon may be lifted bodily away from the section —14—, it being understood that by reversing these operations the front end of the trailer may be re-connected to the supplemental frame of the tractor.

It will also be observed that the central opening —20— in the socket section —14'— is of sufficient diameter to permit the shank —25— of the ball —15— to readily pass therethrough when the nut on the shank is removed which greatly facilitates the assembly of the various parts of the universal coupling.

When the trailer is detached from the supplemental frame of the tractor the front end thereof may be supported in a substantially horizontal position by means of suitable legs —a— carried by the body and having at one end supporting bases —b— and at its other end rests —c— adapted to engage shoulders —e— on the sides of the body.

*Automatic counterbalance.*

In view of the fact that the front end of the trailer is directly connected to the upper bar —11— of the supplemental frame —9— independently of the main frame of the tractor and that the supplemental frame —9— is mounted upon the rear axle housing for relative forward and rearward rocking movement about the axis thereof, it is evident that this movement must be limited to an almost negligible degree, and, therefore, the resistance of the load on the trailer would tend, were it not for the arrangement described in the next paragraph, to tilt the front end of the tractor upwardly when propelled forwardly which tilting would be, of course, objectionable should it be allowed to occur.

In order to overcome this objectionable result and at the same time to limit the forward and rearward rocking movement of the supplementary frame —9— a bracket —26— is rigidly secured to the rear end of the tractor frame or housing in a plane below and some distance to the rear of the axis of the traction wheels and carries at its lower side a pair of laterally spaced depending lugs or ears —27— and crossbolt between and upon which respectively is journaled a rotary sheave —28—.

This sheave is supported some distance to the rear and in approximately the horizontal plane of the lower cross bar —11— and substantially midway between the ends thereof.

A double clevis —29— is centrally pivoted by a bolt —30— to extend forwardly and rearwardly therefrom, and is provided at its forward and rearward ends with attaching bolts —31— for receiving the adjacent ends of suitable cables or chains —32— and —33—.

The other ends of these chains or cables —32— and —33— are attached to one end of a turn buckle —34— which, in this instance, is connected to the rear end of a forwardly extended coil spring —35— having its front end attached to a suitable anchor plate —36— on the front axle as —A— of the tractor as shown in Figure 1.

The intermediate portion of the cable —33— is passed around the sheave —28—, and together with the clevis —31— and chain —32—, turn buckle —34—, coil spring —35— and anchor —36— constitutes a resilient connection between the front end of the tractor frame and lower portion of the supplemental frame —9—. The spring —35— is relatively strong and heavy to keep the connection rather tight and to assist in resisting the upward tilting movement of the frame of the tractor when propelled forwardly with the loaded trailer attached thereto.

For example, when the machine is propelled forwardly the resistance of the loaded trailer tends to rock the upper part of the supplemental frame rearwardly and consequently tends to rock the lower side of the same supplemental frame forwardly which, in turn, causes a similar forward movement of the upper side of the chain —33— through the medium of the clevis —31— thereby placing the lower side of the same cable —33—, turn buckle —34— and spring —35— under sufficient tension to resist the rocking movement of the supplemental frame and at the same time to exert a downward pull upon the front end of the tractor frame to offset its tendency to tilt upwardly.

On the other hand, reversing the direction of movement of the tractor and trailer tends to rock the lower end of the supplemental frame rearwardly which is resisted by the tensioning of the cable —32— and its connection with the anchorage —36— through the medium of the turn buckle —34— and spring —35—.

It, therefore, follows that any tendency toward forward or rearward movement of the trailer relatively to the tractor by the connection of said trailer with the supplemental frame above the axis of the housing is counter balanced by the connections between the lower part of the supplemental frame and front end of the tractor frame as previously described.

What I claim is:

1. A semi-trailer attachment for tractors comprising a supplemental frame adapted to be mounted upon the rear end of the tractor frame to extend above and beneath the rear axle-housing, means for attaching the front end of the trailer to the upper portion of the supplemental frame, and means for connecting the lower portion of the supplemental frame to the tractor frame some distance in front of the rear axle.

2. A semi-trailer attachment for tractors comprising a supplemental frame adapted to be mounted upon the tractor frame to extend above and below the horizontal plane of the rear axle of the tractor, means for connecting the front end of the trailer to said supplemental frame above said axle, and means for connecting the front end of the tractor frame to said part below said axle.

3. A semi-trailer attachment for tractors comprising an upright frame mounted intermediate its ends upon the rear axle-housing of the tractor, turning connections between the front end of the trailer and upper portion of the supplemental frame, and resilient connections between the lower portion of the supplemental frame and front end of the tractor frame.

4. In a semi-trailer attachment for tractors, a supplemental frame having spaced bearings for engaging the tractor frame some distance from and at opposite sides of the longitudinal center thereof, means on the upper portion of the supplemental frame for connection with the front end of a trailer, and means connected to the lower portion of the frame for connection with the front end of the tractor frame.

5. A semi-trailer attachment for tractors adapted to be supported upon the rear axle-housing of the tractor to extend above and below the axis thereof, and provided with separate devices above and below said axis for connection with the front end of the trailer and the front end of the tractor frame respectively.

6. A semi-trailer attachment for tractors adapted to be supported upon the rear axle-housing of the tractor to extend above and below the axis thereof, and provided with separate devices above and below said axis for connection with the front end of the trailer and the front end of the tractor frame respectively, one of said devices including a resilient part.

7. In a semi-trailer attachment for tractors, a supplemental frame mounted on the rear axle-housing of the tractor for forward and rearward rocking movement about the axis of said housing, ball and socket connections between the upper portion of the frame and front end of the trailer, and resilient connections between the lower portion of the supplemental frame and front portion of the tractor frame.

8. A semi-trailer attachment for tractors, comprising an upright supplemental frame having bearings for engaging the rear axle-housing of the tractor frame, means including a ball and socket joint for connecting the upper portion of the suplemental frame with the front end of a trailer, and resilient means for connecting the lower portion of the supplemental frame with the front end of the tractor.

9. In a semi-trailer attachment for tractors, an upright supplemental frame having bearings intermediate its lower and upper sides adapted to rest upon the rear axle-housing of the tractor, a sheave and supporting means therefore adapted to be secured to the tractor frame at the rear of the housing, a cable passed around the sheave and having one end operatively connected to the lower portion of the supplemental frame and its other end operatively connected to the front end of the tractor frame, and means for connecting the upper portion of the supplemental frame to the front end of a trailer.

10. In a semi-trailer attachment for tractors, an upright supplemental frame having bearings intermediate its lower and upper sides for engaging the rear axle-housing of the tractor, a sheave and means for supporting the same upon the tractor frame at the rear of the supplemental frame, a clevis mounted on the lower part of the supplemental frame, cables having one end connected to said clevis and their other ends connected to the front end of the tractor frame, one of said cables being passed around said sheave, and means for connecting the upper portion of the supplemental frame to the front end of the trailer frame.

11. The combination with a tractor and trailer, of an upright supplemental frame mounted on the rear axle-housing of the tractor for forward and rearward rocking movement, connections between the upper portion of the supplemental frame and trailer, and separate connections between the lower portion of the trailer and front end of tractor frame including a turn buckle.

12. A semi-trailer attachment for tractors comprising an upright frame mounted on the rear axle of the housing and extending above and below the axis thereof, means including a universal joint for connecting the upper portion of the frame to the front end of the trailer, a sheave and means for supporting the same on the tractor frame at the rear of the upright frame, a cable passed around the sheave, connections between one end of the cable and suplemental frame, and additional connections between the other end of the cable and front end of the tractor frame.

In witness whereof I have hereunto set my hand this 13th day of March, 1925.

ALONZO L. HUMPHREY.